(12) United States Patent
Hui

(10) Patent No.: US 9,157,623 B2
(45) Date of Patent: Oct. 13, 2015

(54) MULTIPLE BEAM LIGHT SOURCE

(71) Applicant: Gan Jun Hui, Guangdong (CN)

(72) Inventor: Gan Jun Hui, Guangdong (CN)

(73) Assignee: Quantum Lighting Products Ltd., Kowloon (HK)

( * ) Notice: Subject to any disclaimer, the term of this patent is extended or adjusted under 35 U.S.C. 154(b) by 140 days.

(21) Appl. No.: 13/838,750

(22) Filed: Mar. 15, 2013

(65) Prior Publication Data

US 2014/0146552 A1  May 29, 2014

(30) Foreign Application Priority Data

Nov. 26, 2012  (CN) .......................... 2012 2 0629656

(51) Int. Cl.
| | |
|---|---|
| *F21V 23/04* | (2006.01) |
| *F21L 4/00* | (2006.01) |
| *F21V 21/08* | (2006.01) |
| *B60Q 1/00* | (2006.01) |
| *B62J 6/00* | (2006.01) |
| *B60Q 1/24* | (2006.01) |

(52) U.S. Cl.
CPC ................ *F21V 23/0442* (2013.01); *B62J 6/00* (2013.01); *B62J 6/003* (2013.01); *F21L 4/00* (2013.01); *F21L 15/14* (2013.01); *F21V 23/045* (2013.01); *F21V 23/0435* (2013.01); *B60Q 1/24* (2013.01); *B62J 2006/008* (2013.01)

(58) Field of Classification Search
CPC  F21V 23/0442; B60Q 1/08; B60Q 2300/056; B62J 2006/008; B62J 6/00; B62J 6/003; F21L 15/14; F21L 4/00
USPC .......................................................... 362/473
See application file for complete search history.

(56) References Cited

U.S. PATENT DOCUMENTS

| | | | |
|---|---|---|---|
| 8,297,775 B2 | 10/2012 | Wright et al. | |
| 2010/0213854 A1* | 8/2010 | Rains et al. ................... | 315/149 |
| 2011/0031901 A1* | 2/2011 | Huguenin et al. ............ | 315/307 |
| 2012/0026726 A1* | 2/2012 | Recker et al. ................. | 362/157 |

OTHER PUBLICATIONS

"A Smarter Headlamp," *Wall Street Journal*, Jul. 14, 2012, http://online.wsj.com/article/SB10001424052702303740704577520721062105182.html.

* cited by examiner

*Primary Examiner* — Nimeshkumar Patel
*Assistant Examiner* — Jacob R Stern
(74) *Attorney, Agent, or Firm* — RatnerPrestia

(57) ABSTRACT

A portable light having a transmitter configured to emit a signal, a receiver configured to receive the signal from the transmitter, a source of electric light that includes a plurality of light modes, a power source, and a controller connected to a circuit, wherein the transmitter, the receiver, the source of electric light, the power source, and the switch are included in the circuit. The controller is configured to control the switch and a transition between or among the plurality of light modes in response to the signal received by the receiver.

19 Claims, 23 Drawing Sheets

MULTIPLE BEAM LIGHT SOURCE

CROSS-REFERENCE TO RELATED APPLICATIONS

This application claims priority to Chinese Patent Application No. 201220629656.6, filed Nov. 26, 2012.

FIELD OF THE INVENTION

The present invention relates to a light source having multiple beams and a hands-free switch.

BACKGROUND OF THE INVENTION

Many conventional flashlights or lamps are turned on and off using a pushbutton that actuates a mechanical switch mechanism that opens and closes one or more sets of electrical contacts in order to turn the flashlight on or off or to transition the light between various modes. For example, the lamp may include multiple beams to provide either a spotlight or a flood light. There are certain applications in which a mechanical switch is burdensome for the user, for example, in situations in which the user requires the use of both hands and does not have a free hand in which to operate the lamp. Such situations are commonly experienced in emergency situations by fire-fighters, first responders, and military/security personnel. In addition to emergency situations, requiring two free hands is a common need in industrial/commercial settings such as utility workers who frequently access high wires or utility poles or miners who work underground. In such situations, the ability to have free hands becomes a critical safety issue.

Accordingly, there is a need to have a source of light that may be easily operated without a mechanical switch in a hands-free fashion.

SUMMARY OF THE INVENTION

According to one embodiment of the invention, a portable light is disclosed that may be operated in a hands-free fashion comprising a transmitter configured to emit a signal, a receiver configured to receive the signal from the transmitter, a source of electric light comprising a plurality of light modes, a power source, and a controller connected to a circuit comprising the transmitter, the receiver, the source of electric light, the power source, and a switch. The controller is configured to control the switch and a transition between the plurality of light modes in response to the signal received by the receiver.

BRIEF DESCRIPTION OF THE DRAWINGS

In order that the invention may be more fully understood, the following figures are provided by way of illustration, in which.

DETAILED DESCRIPTION OF THE INVENTION

Figure 1:
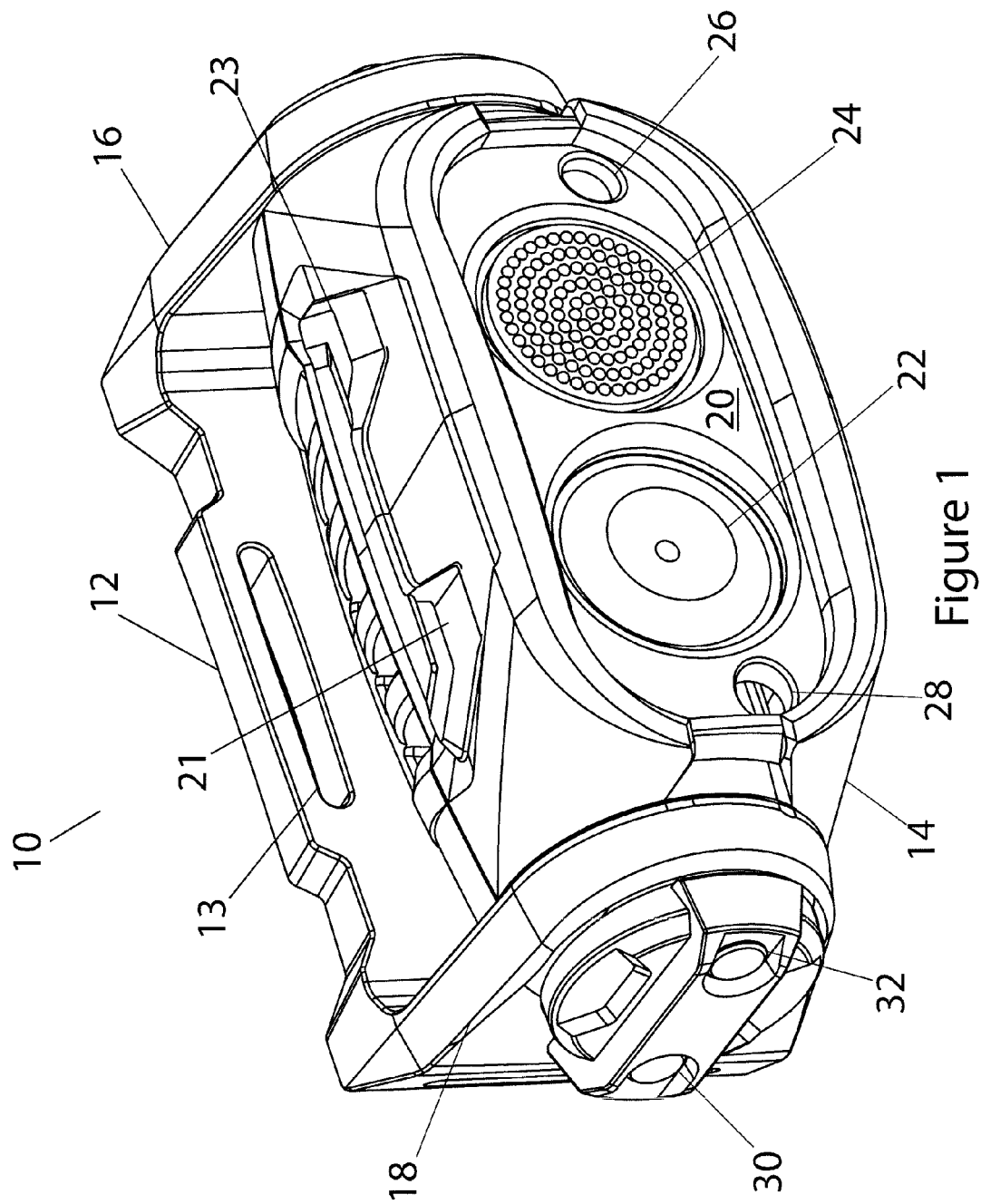
FIG. 1 is a left perspective view of a lamp according to an embodiment of the present invention.
Figure 2:
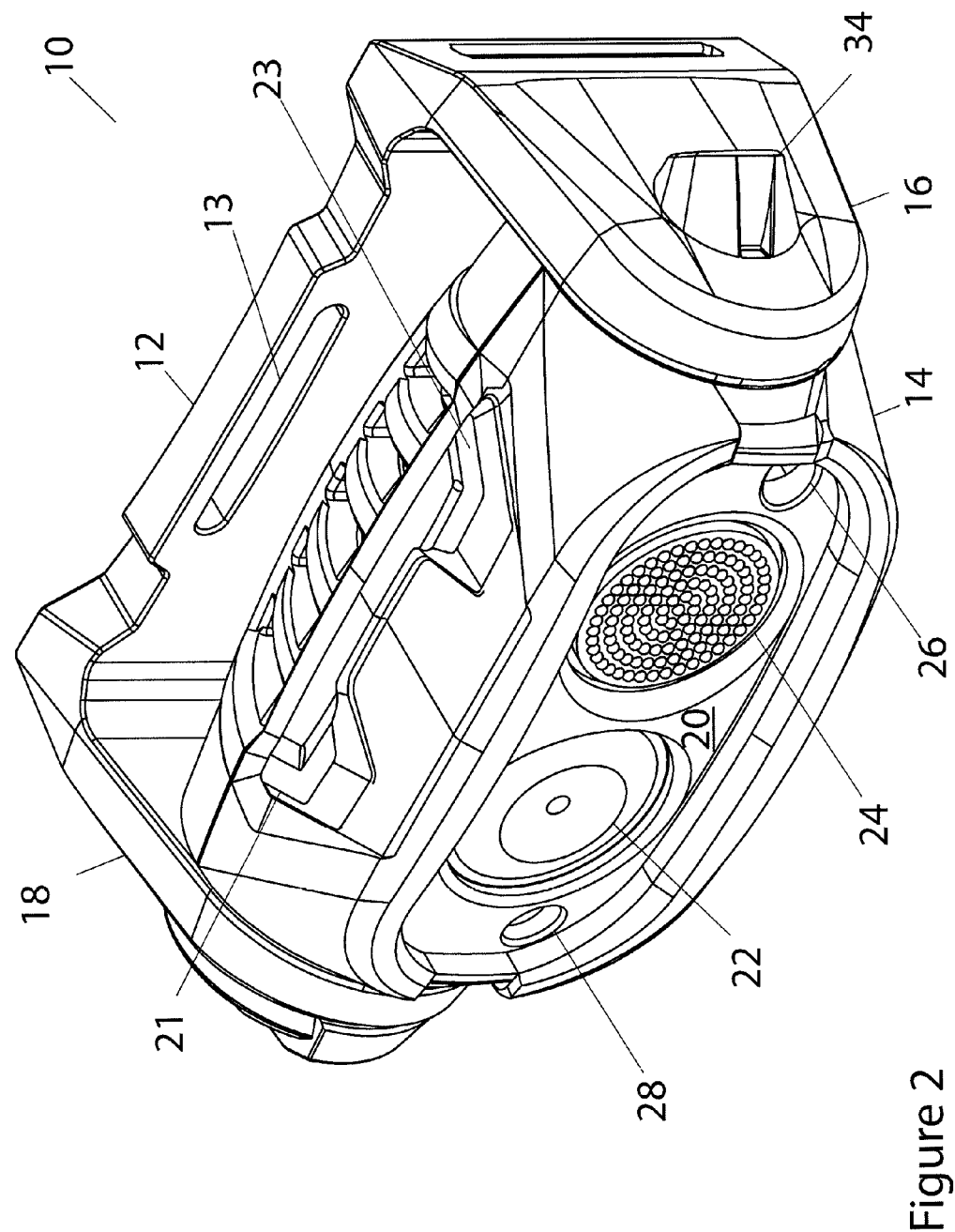
FIG. 2 is a right perspective view of the lamp of FIG. 1.
Figure 3:
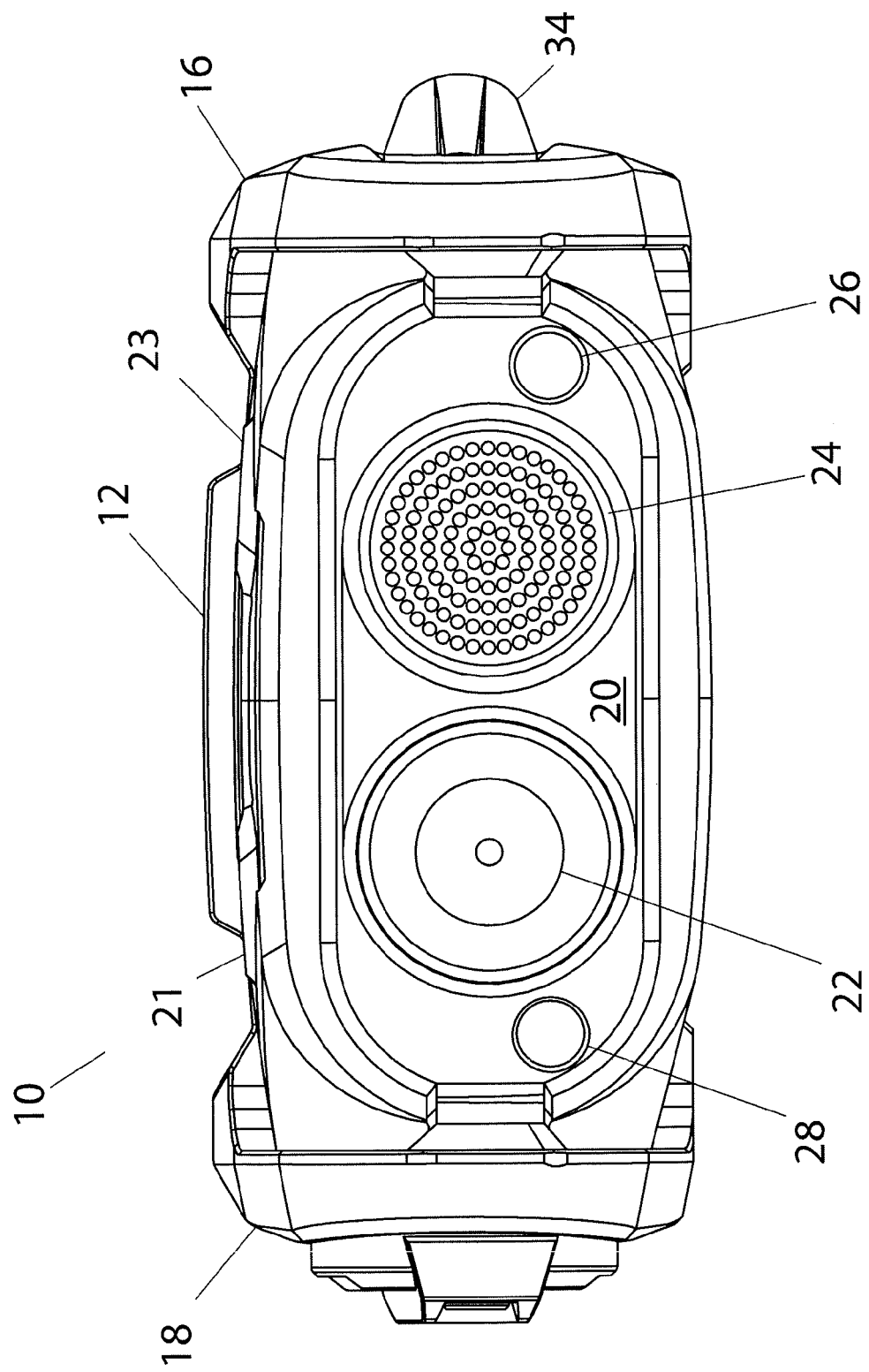
FIG. 3 is a front view of the lamp of FIG. 1.
Figure 4:
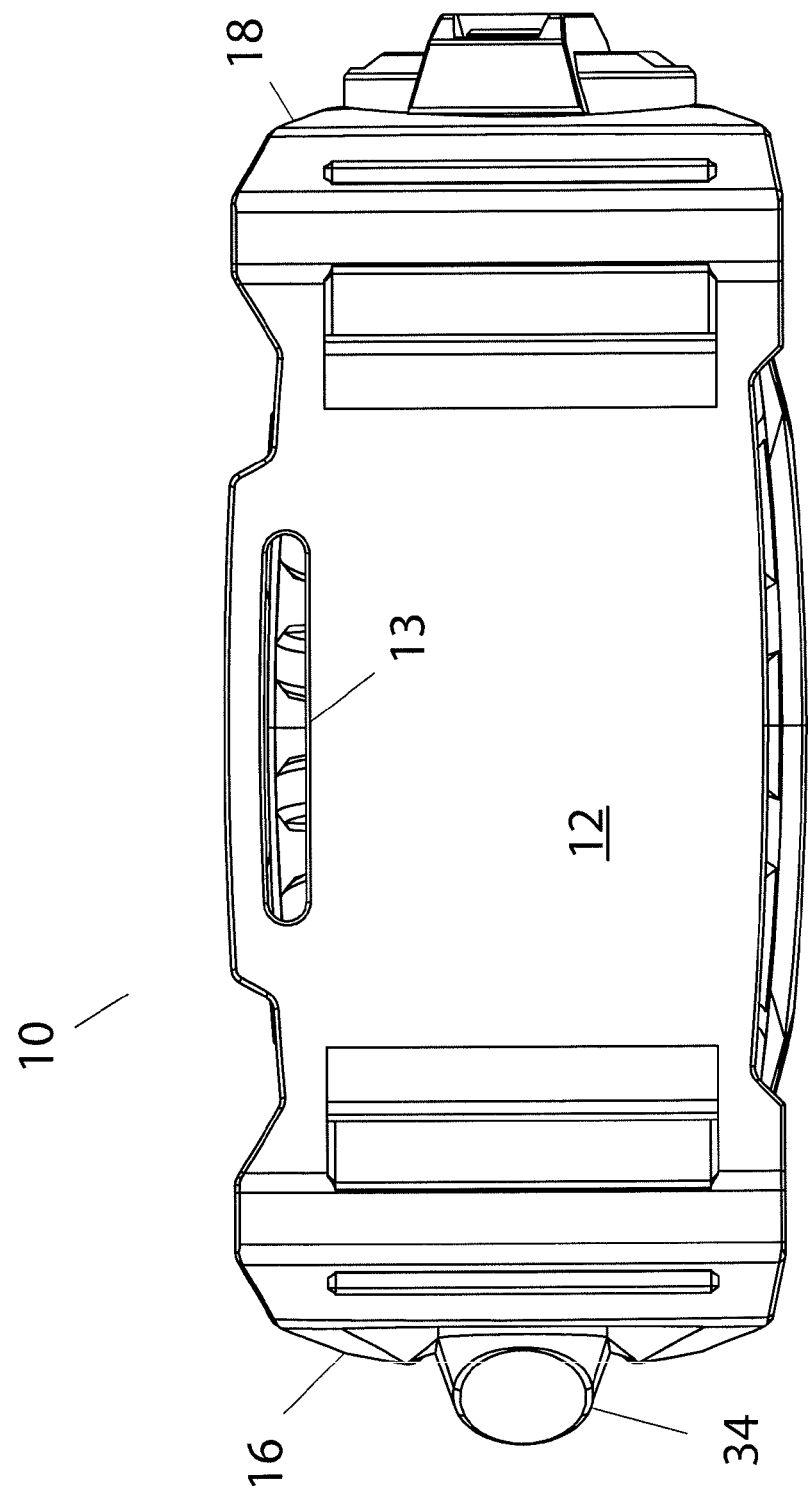
FIG. 4 is a rear view of the lamp of FIG. 1.
Figure 5:
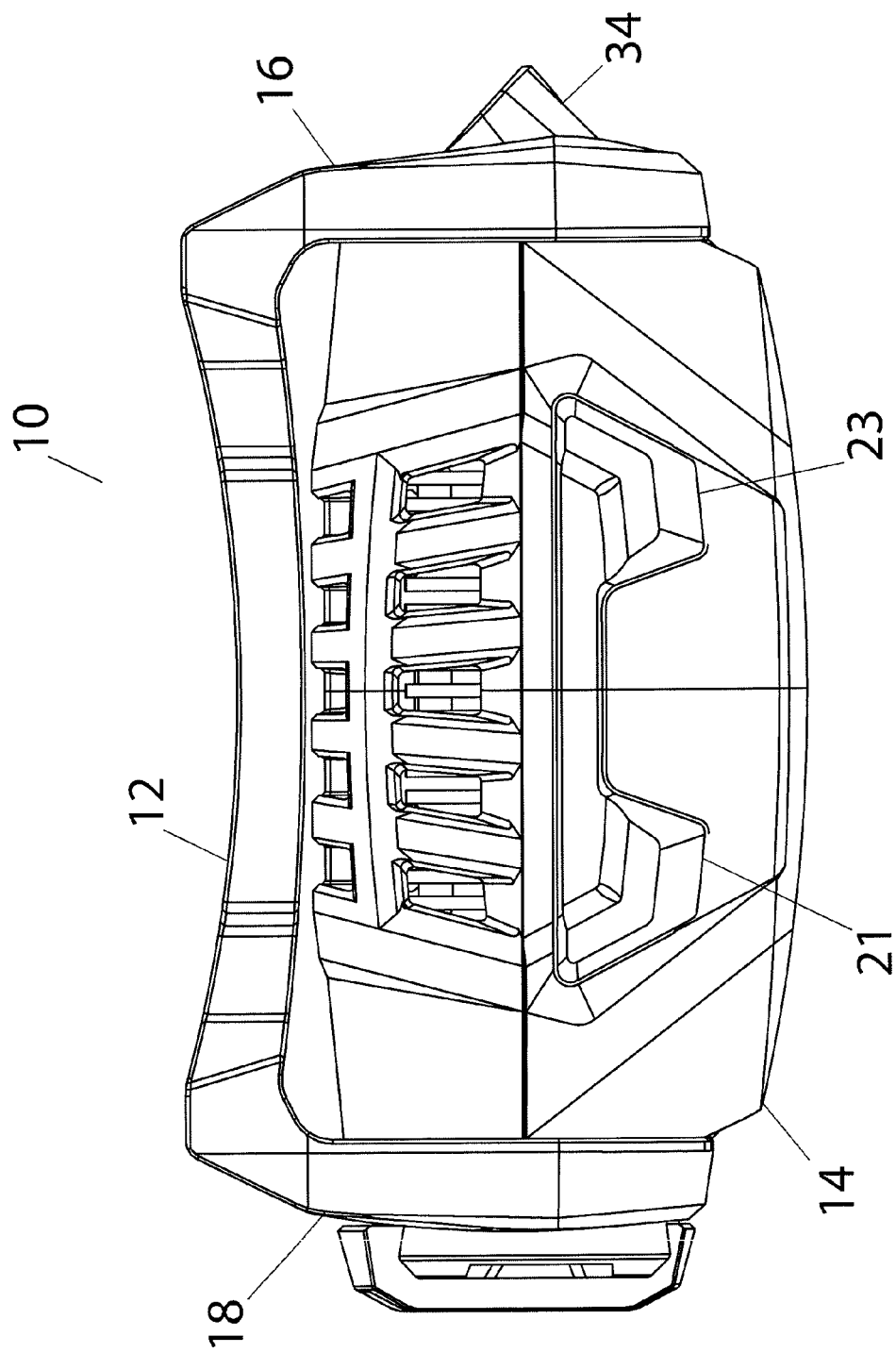
FIG. 5 is a top view of the lamp of FIG. 1.
Figure 6:
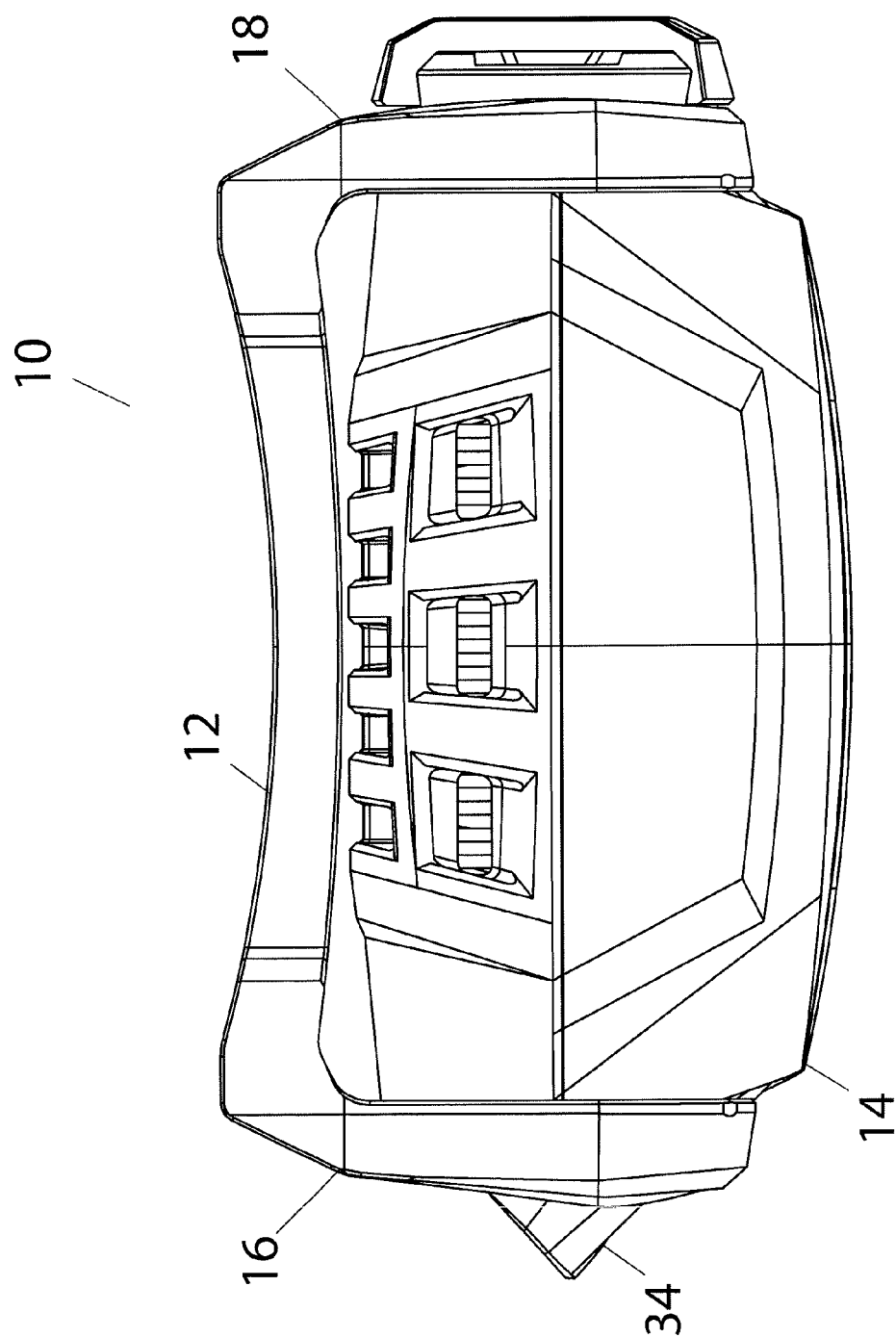
FIG. 6 is a bottom view of the lamp of FIG. 1.
Figure 7:
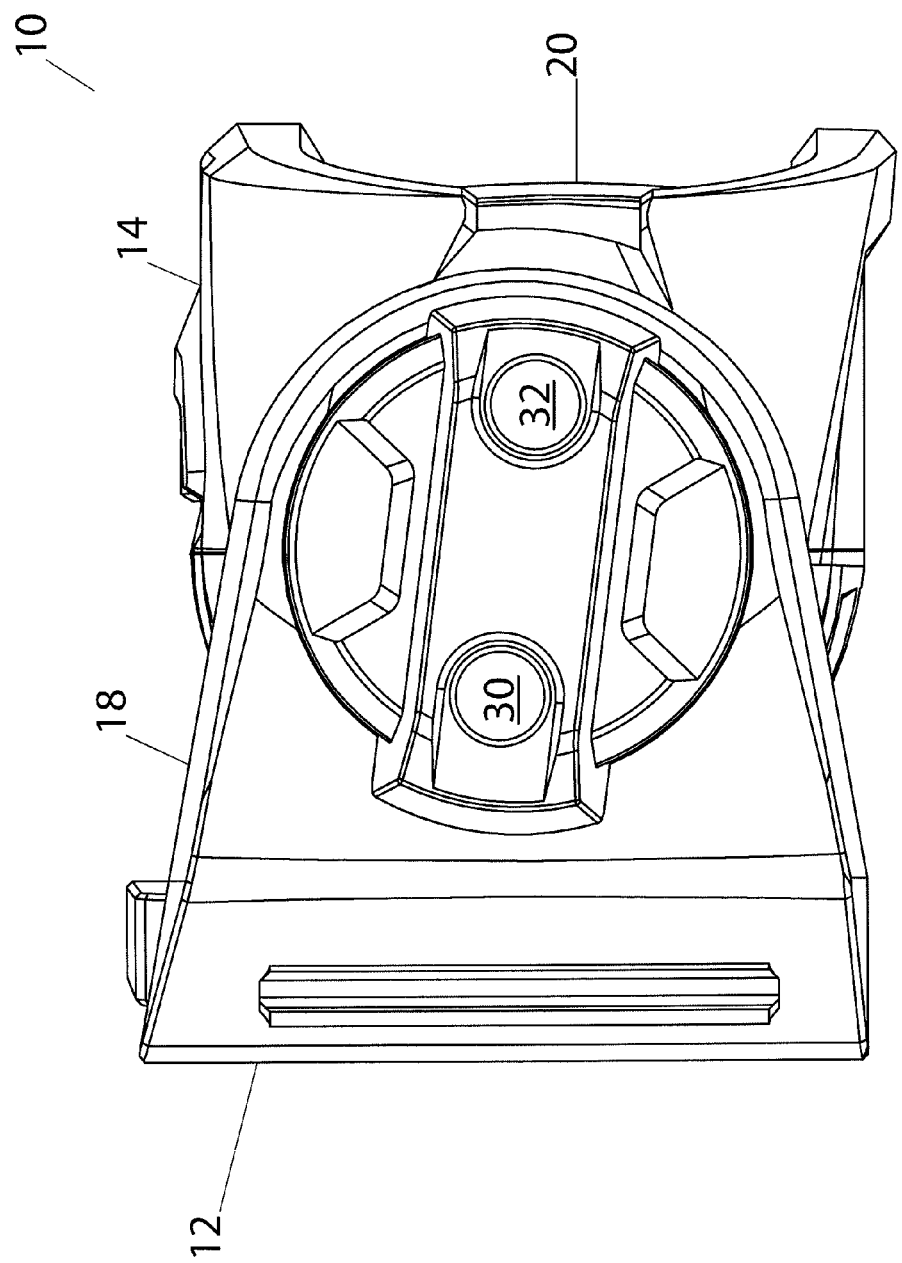
FIG. 7 is a left-side view of the lamp of FIG. 1.
Figure 8:
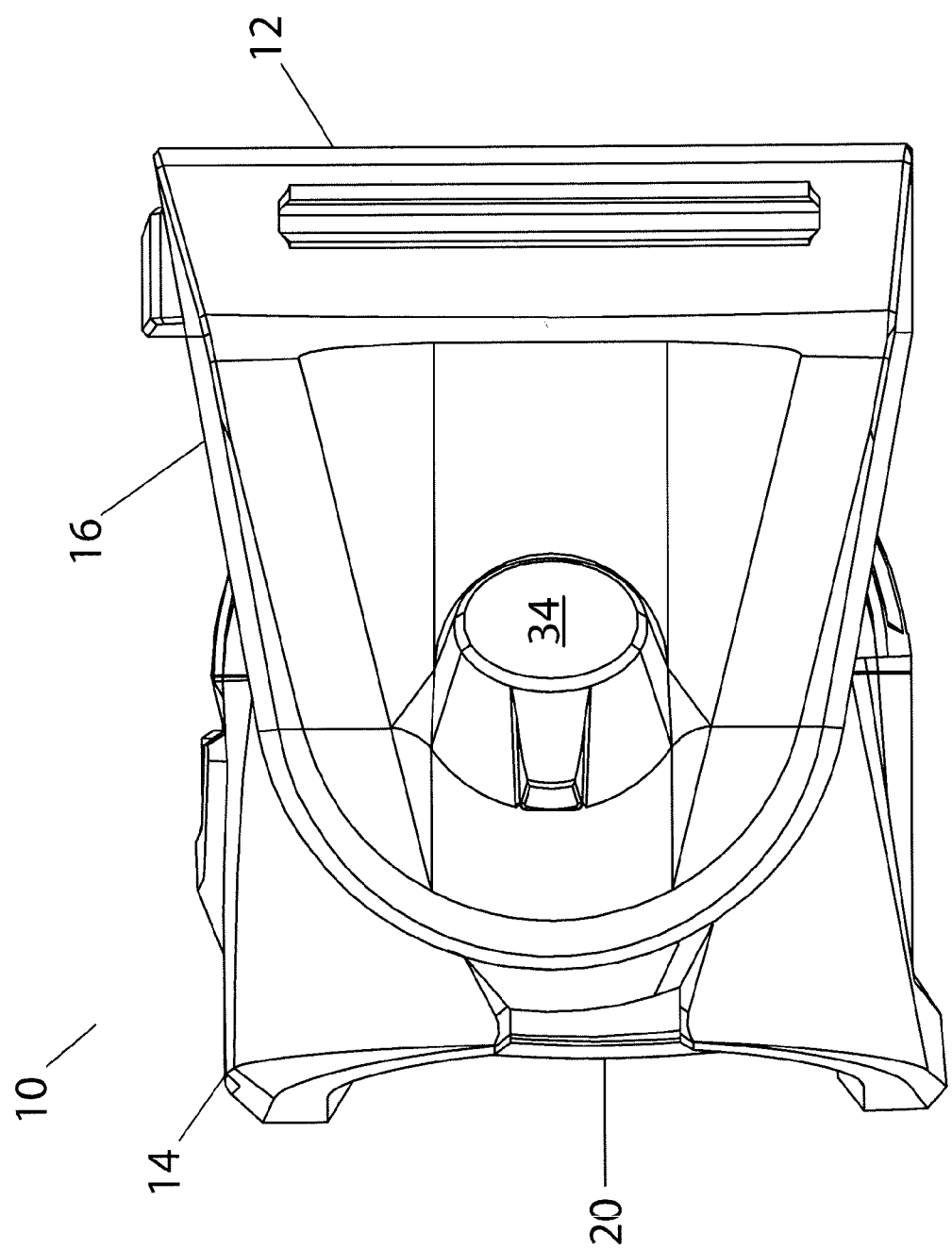
FIG. 8 is a right-side view of the lamp of FIG. 1.
Figure 9:
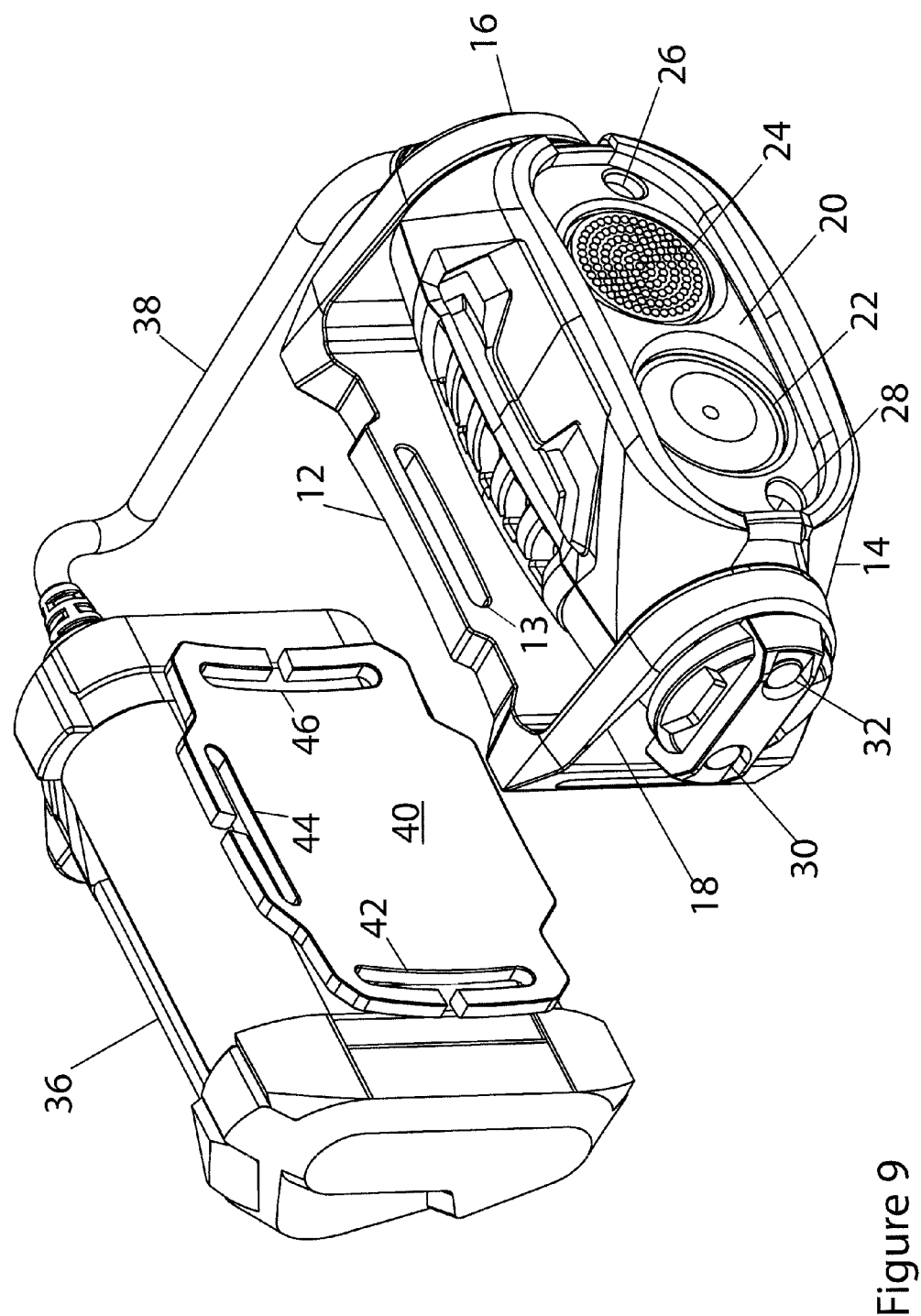
FIG. 9 is a left perspective view of a lamp according to the embodiment of FIG. 1 in combination with a power supply and controller housing.
Figure 10:
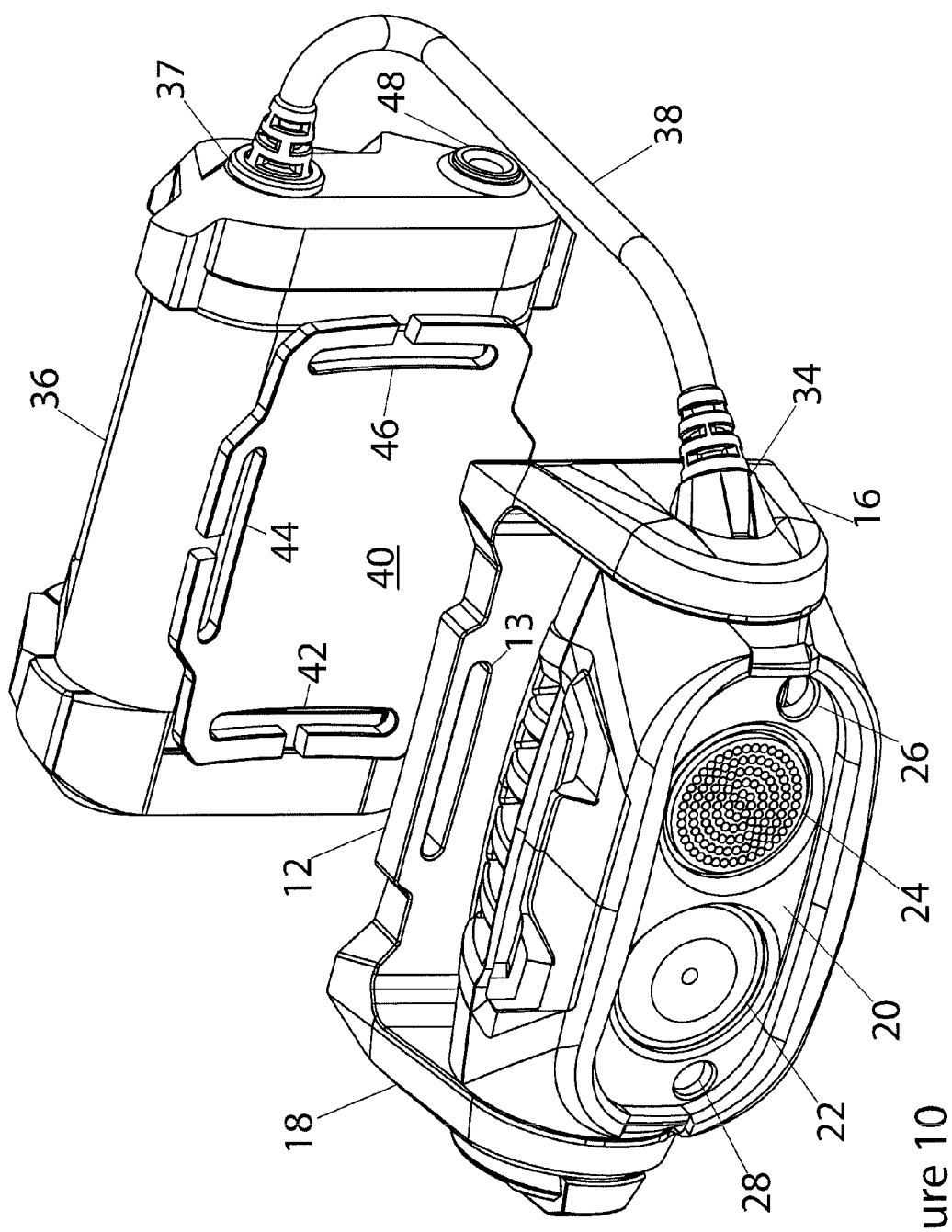
FIG. 10 is a right perspective view of the combination lamp and housing in FIG. 9.
Figure 11:
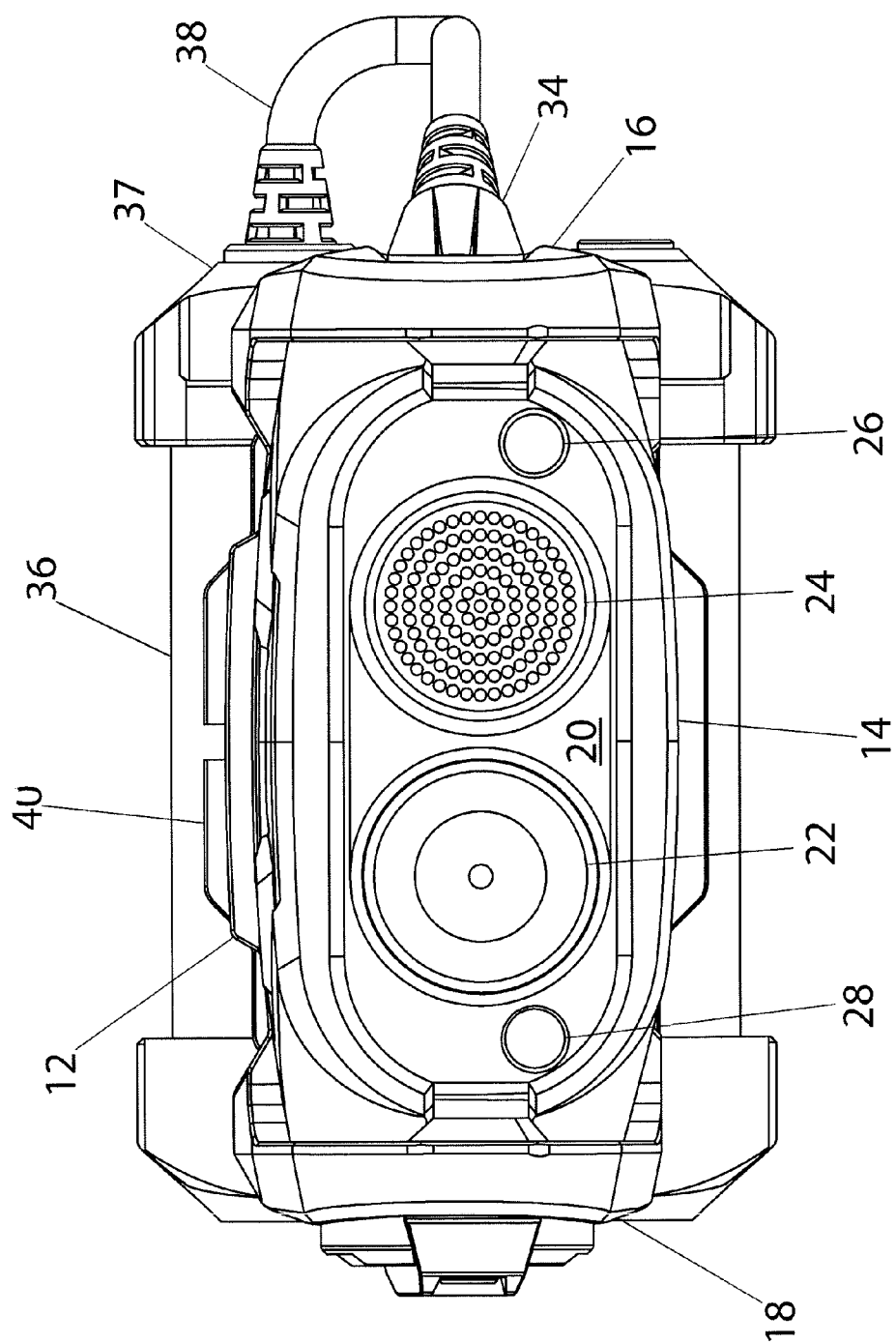
FIG. 11 is a front view of the combination lamp and housing in FIG. 9.
Figure 12:
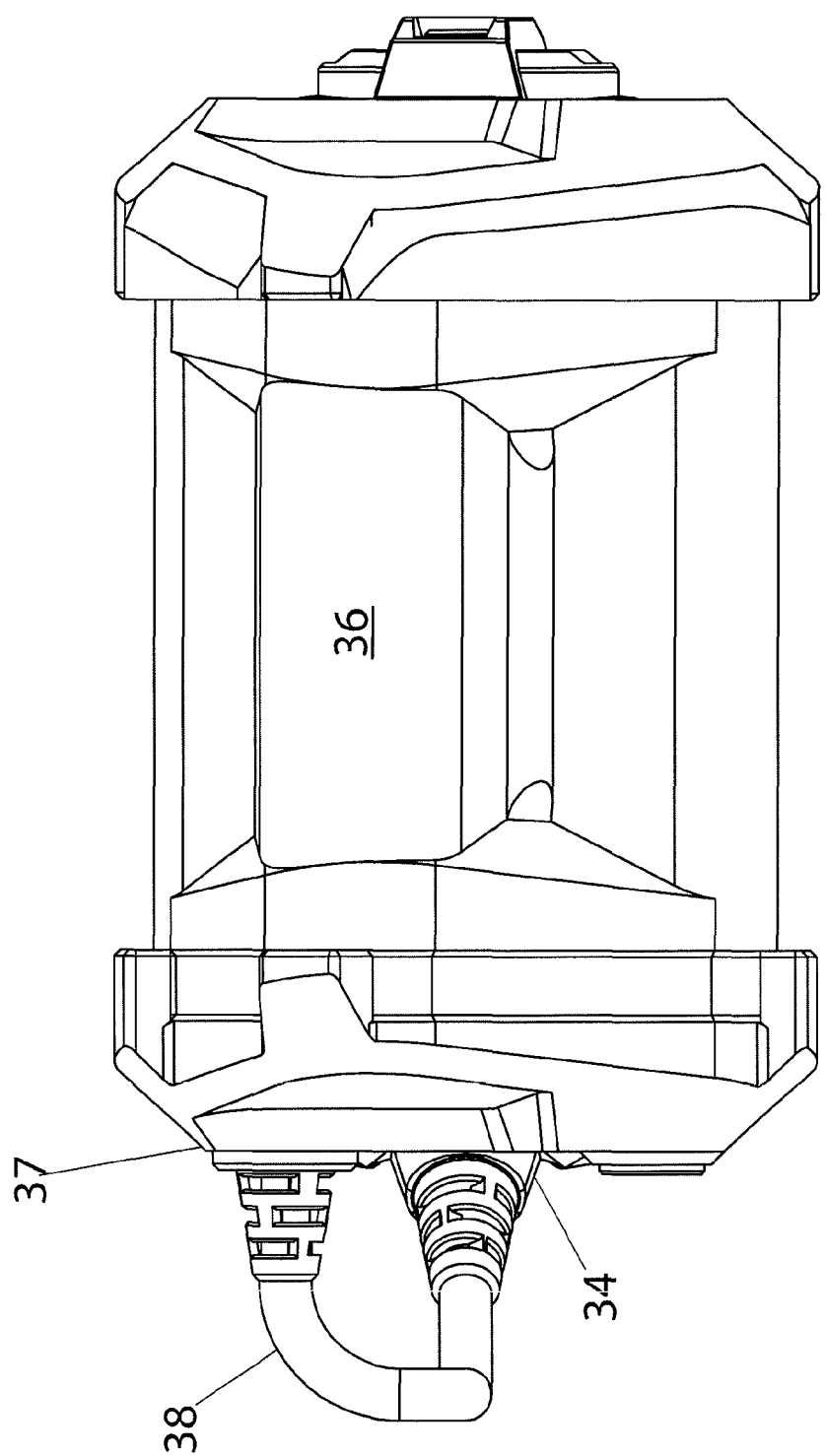
FIG. 12 is a rear view of the combination lamp and housing in FIG. 9.
Figure 13:
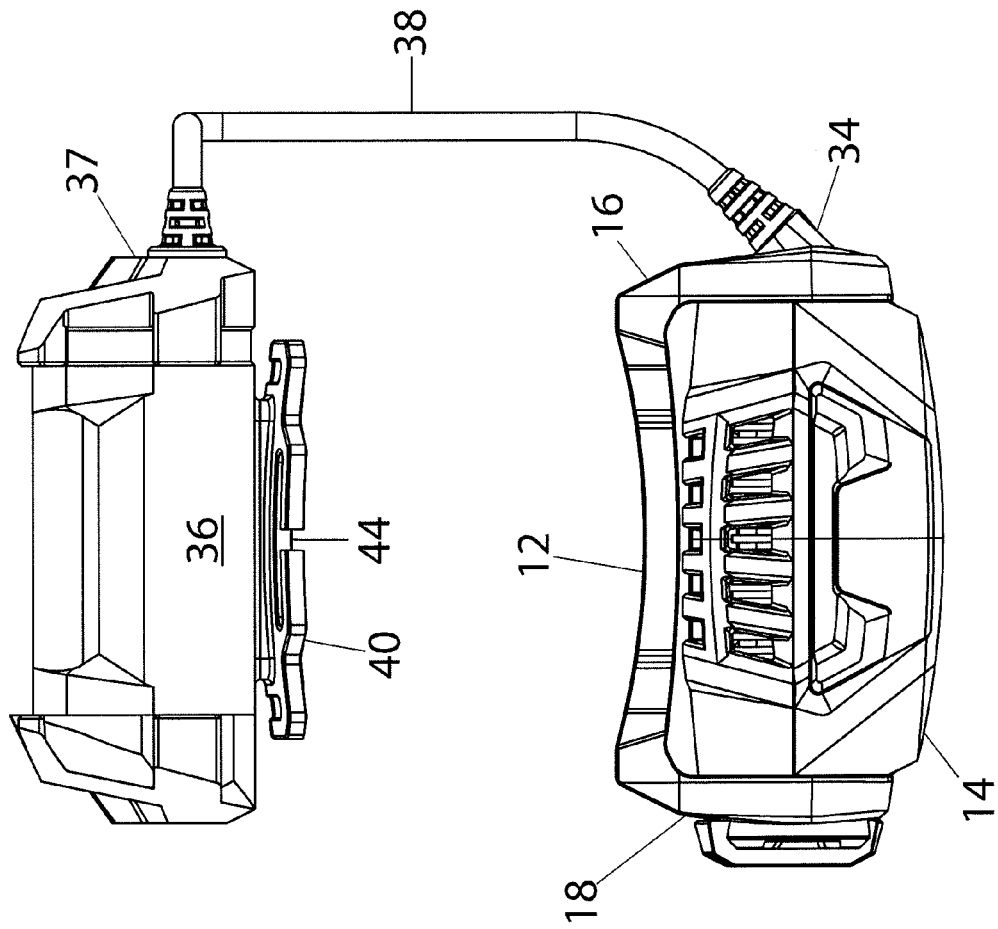
FIG. 13 is a top view of the combination lamp and housing in FIG. 9.
Figure 14:
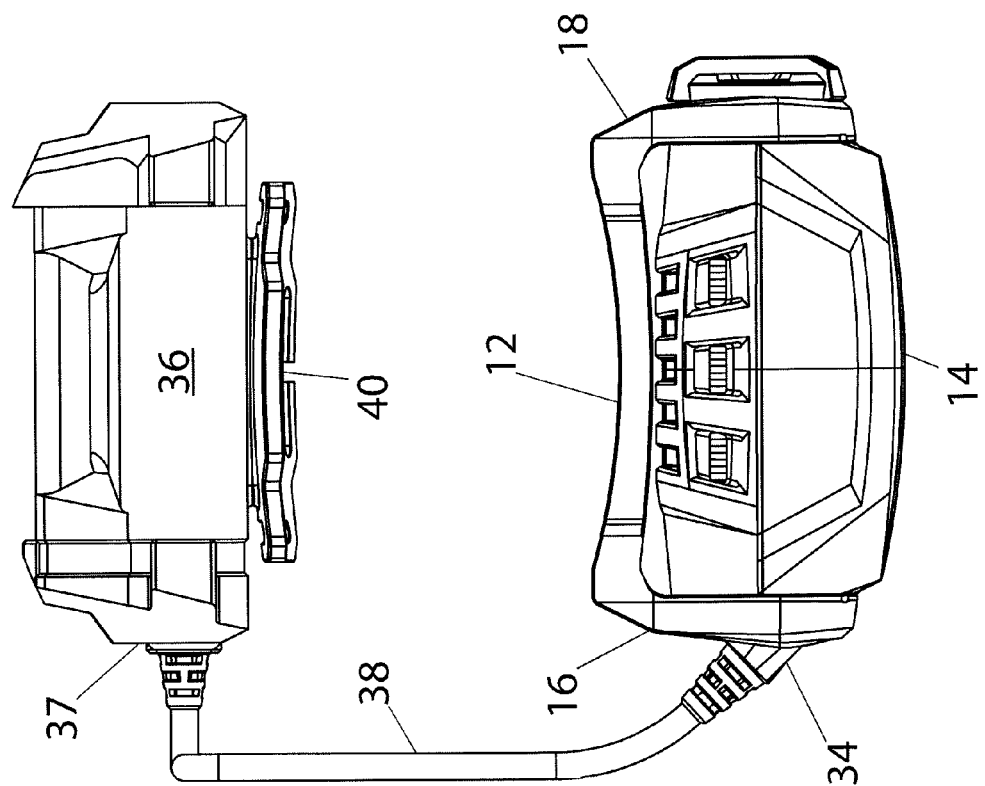
FIG. 14 is a bottom view of the combination lamp and housing in FIG. 9.
Figure 15:
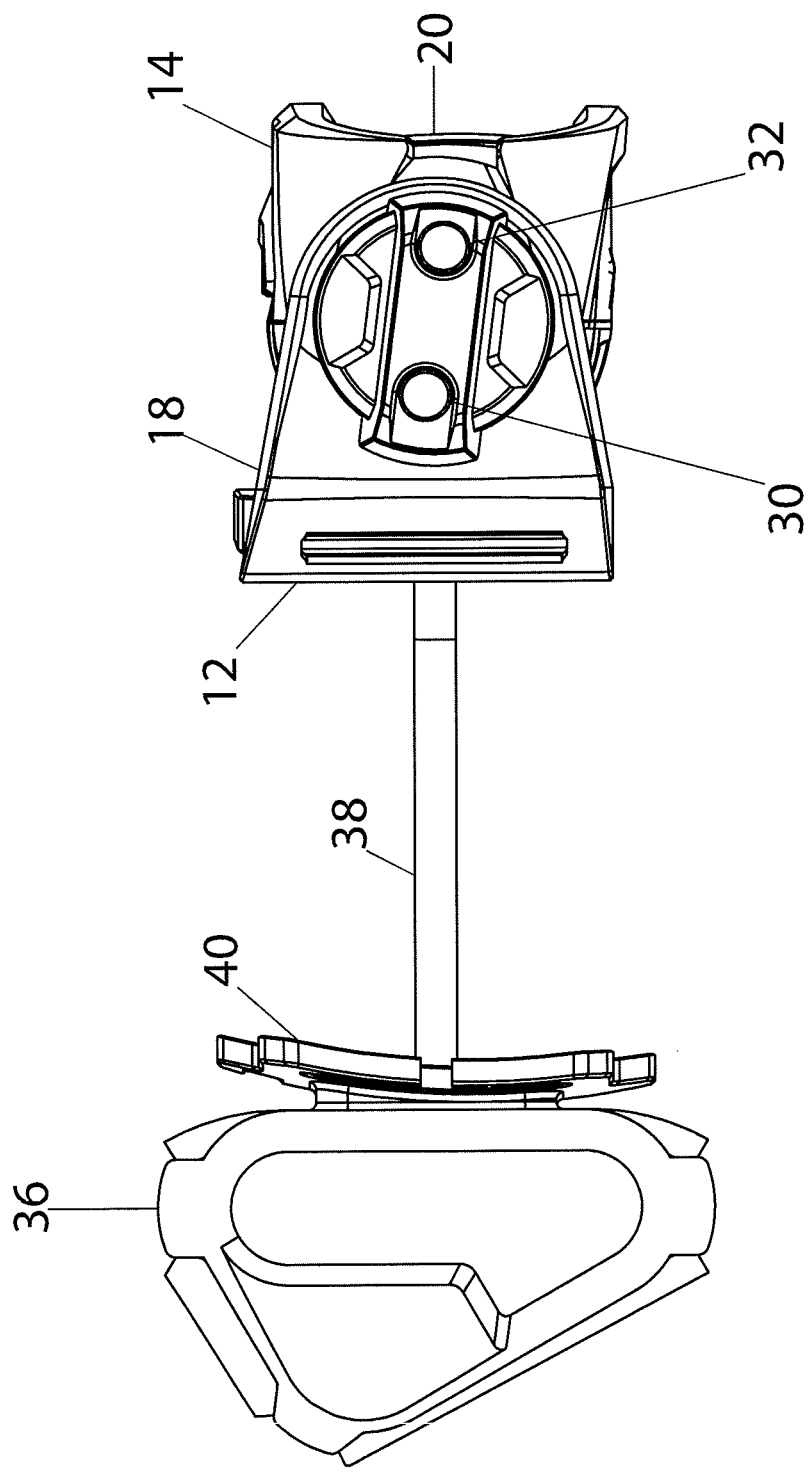
FIG. 15 is a left-side view of the combination lamp and housing in FIG. 9.
Figure 16:
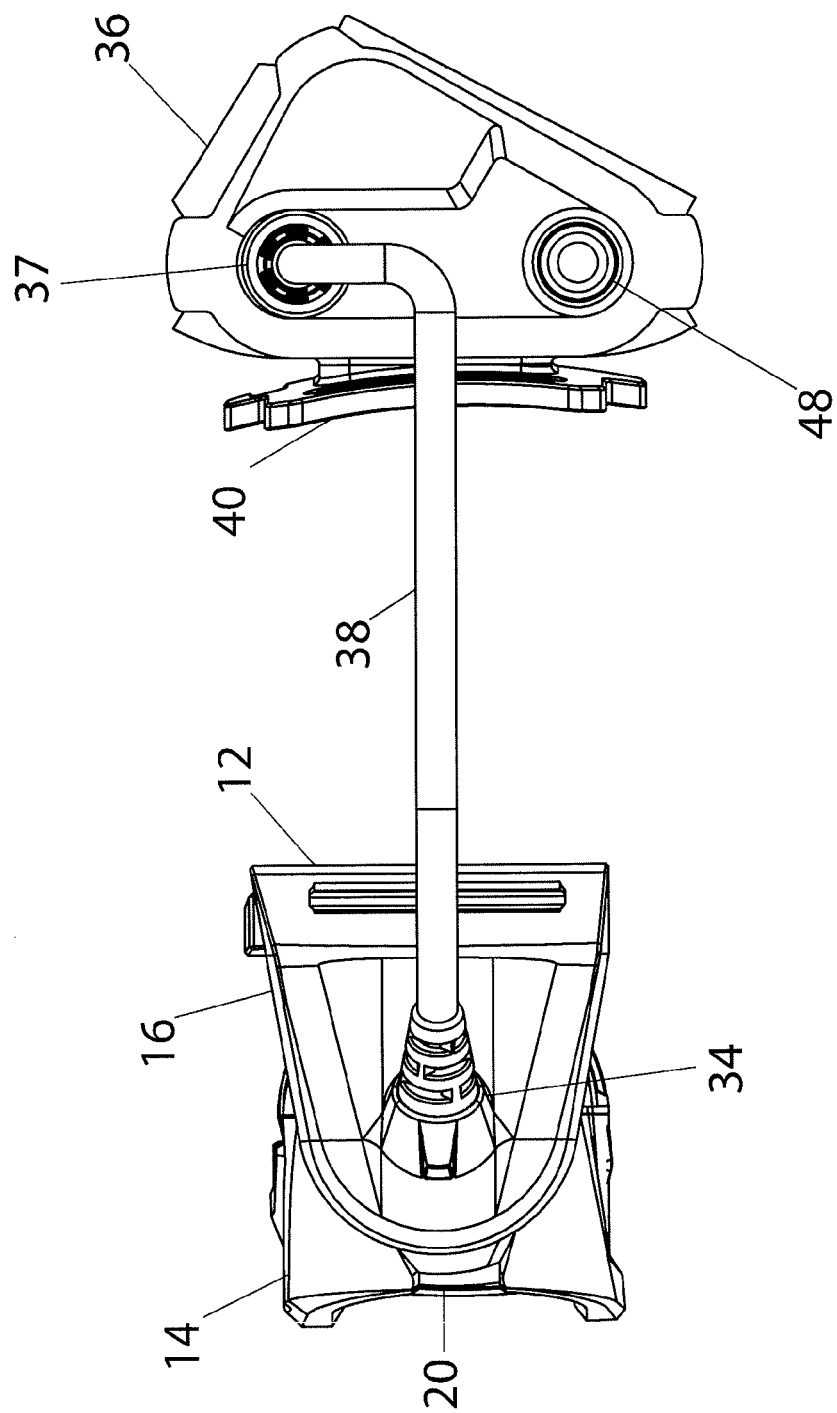
FIG. 16 is a right-side view of the combination lamp and housing in FIG. 9
Figure 17A:
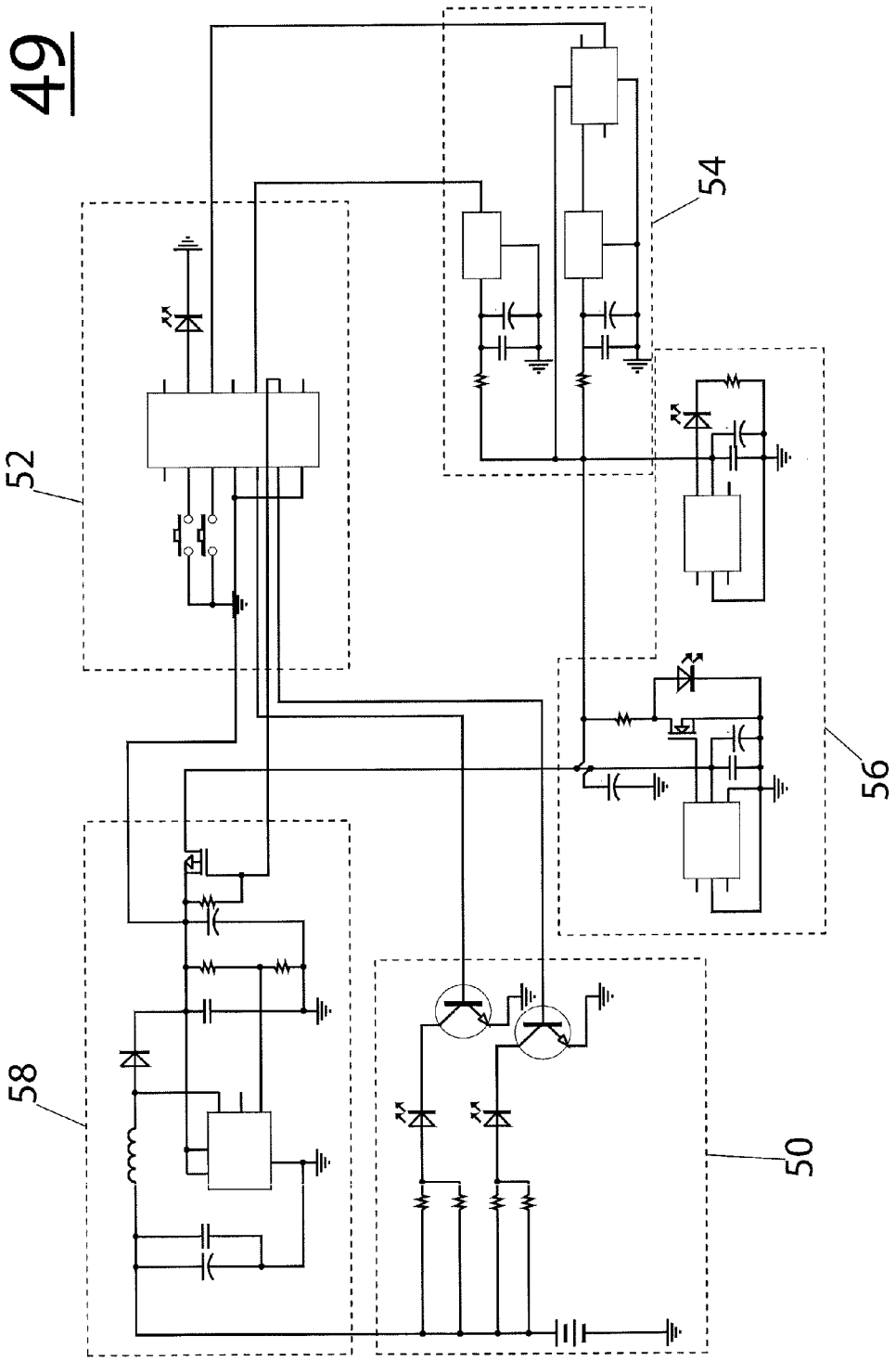
FIG. 17 is a circuit diagram for a portable light according to an embodiment of the present invention.
Figure 17B:
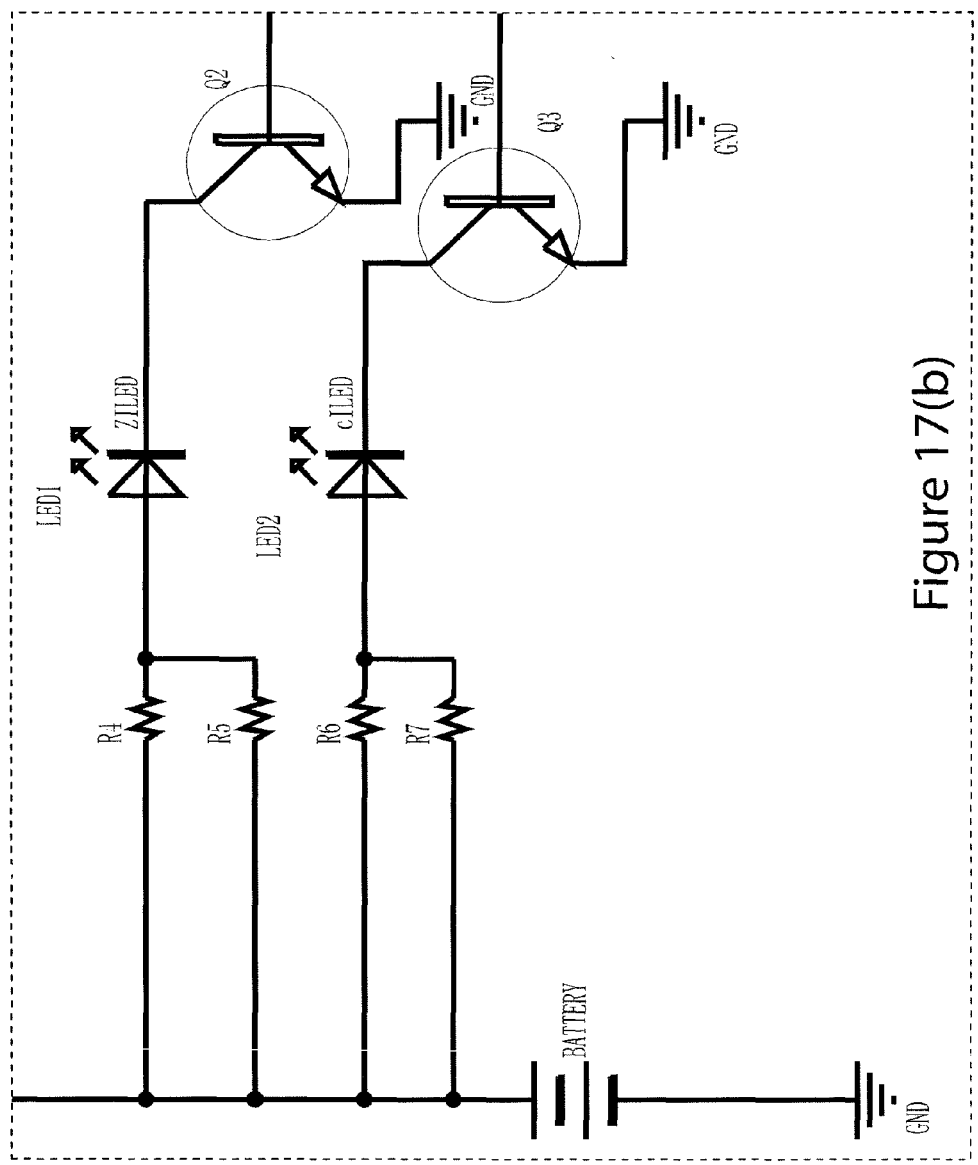
Figure 17C:
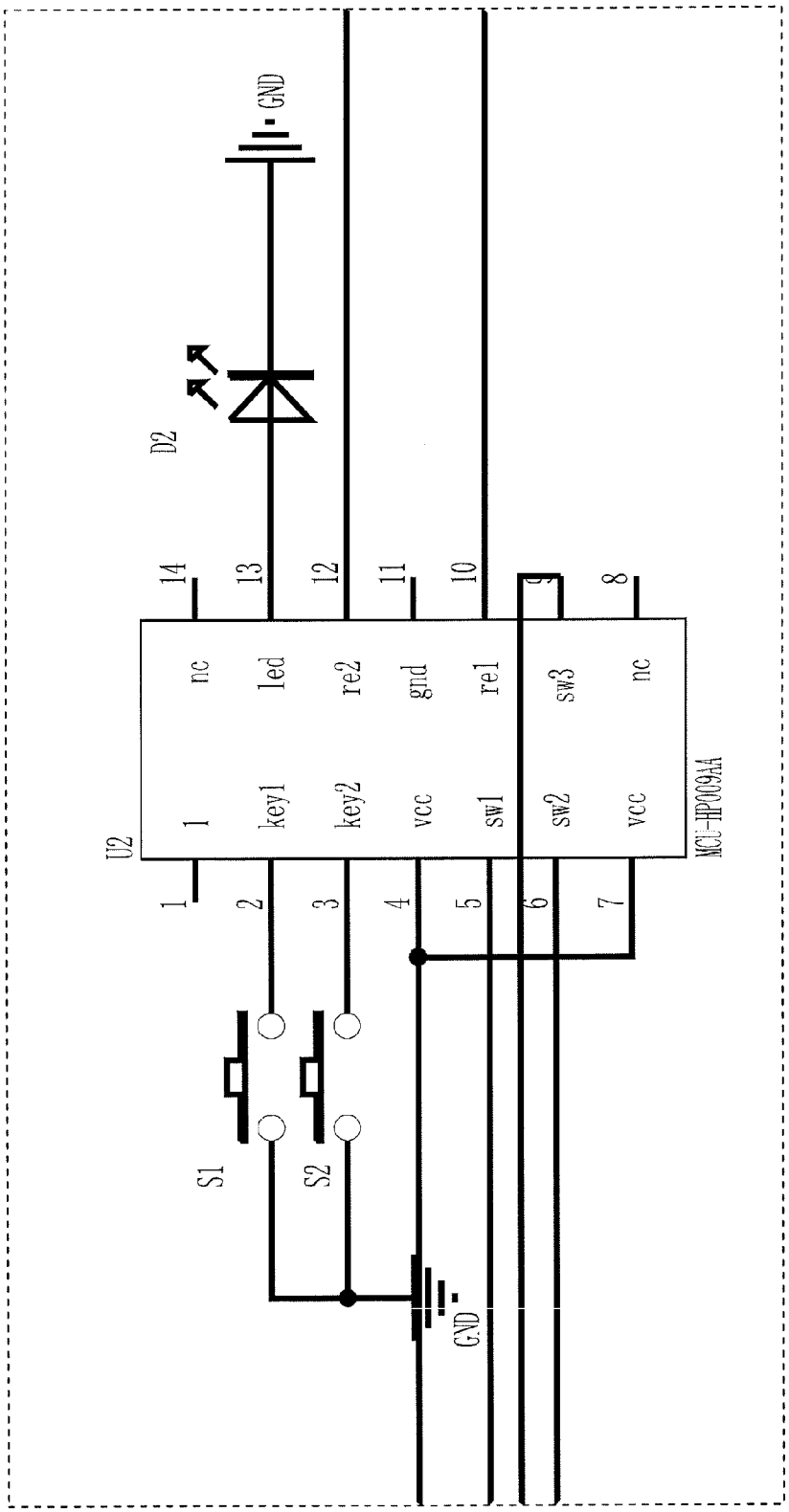
Figure 17D:
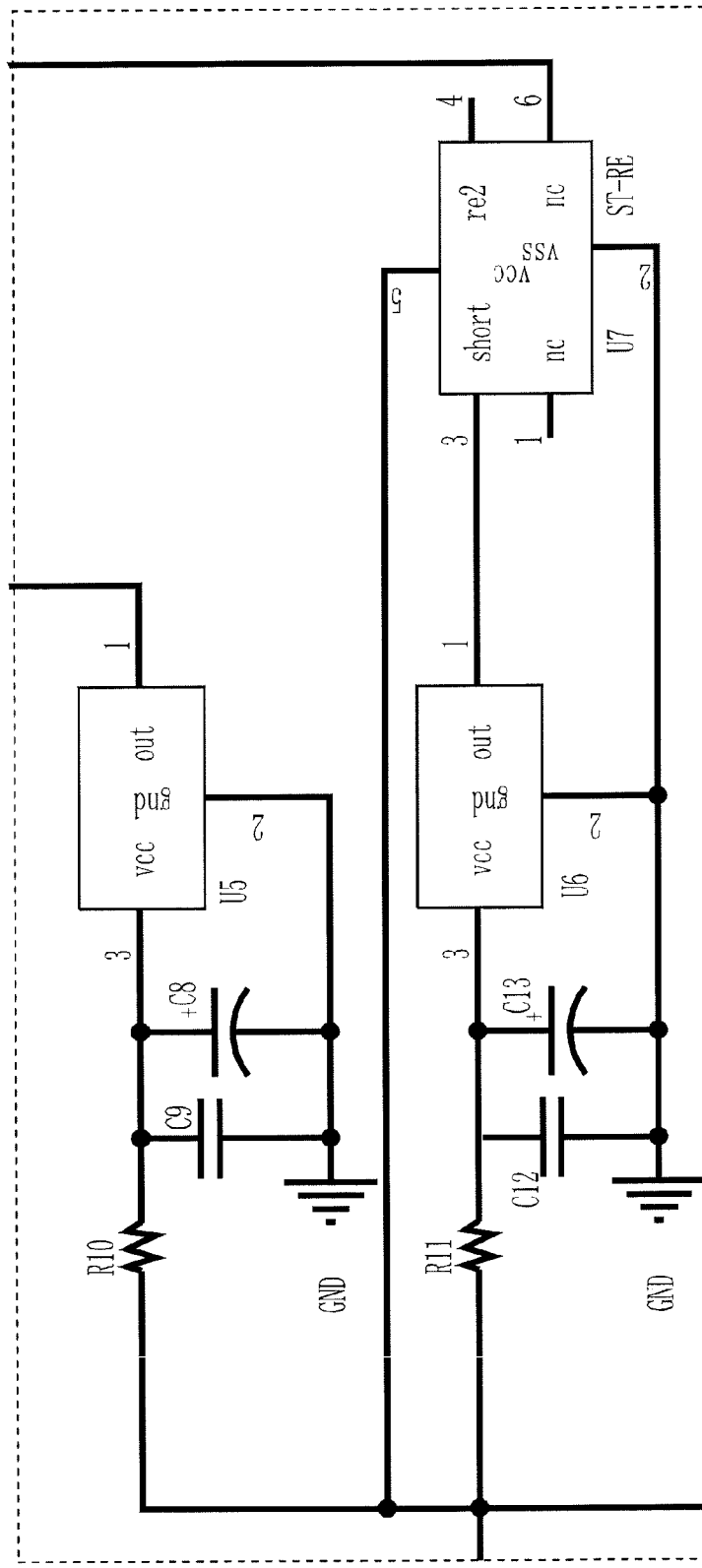
Figure 17E:
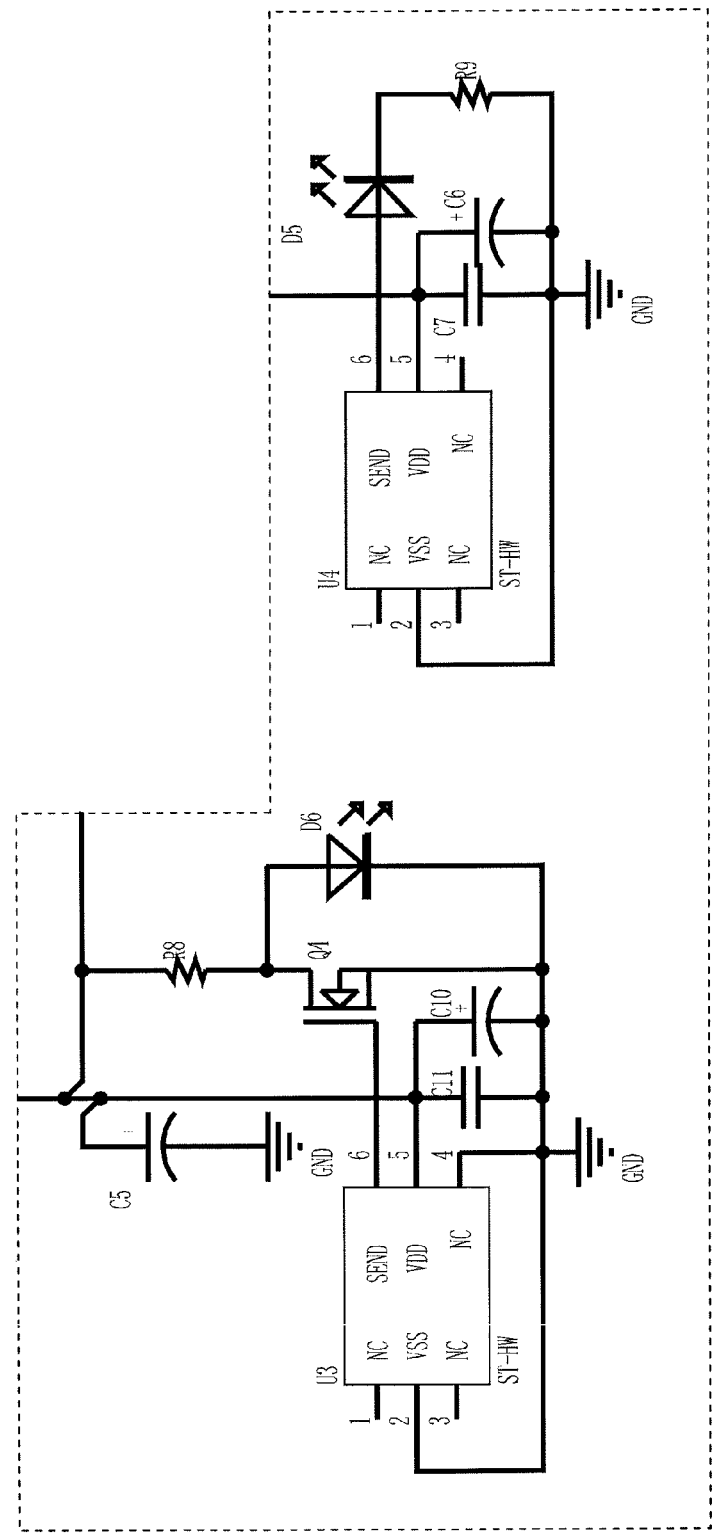
Figure 17F:
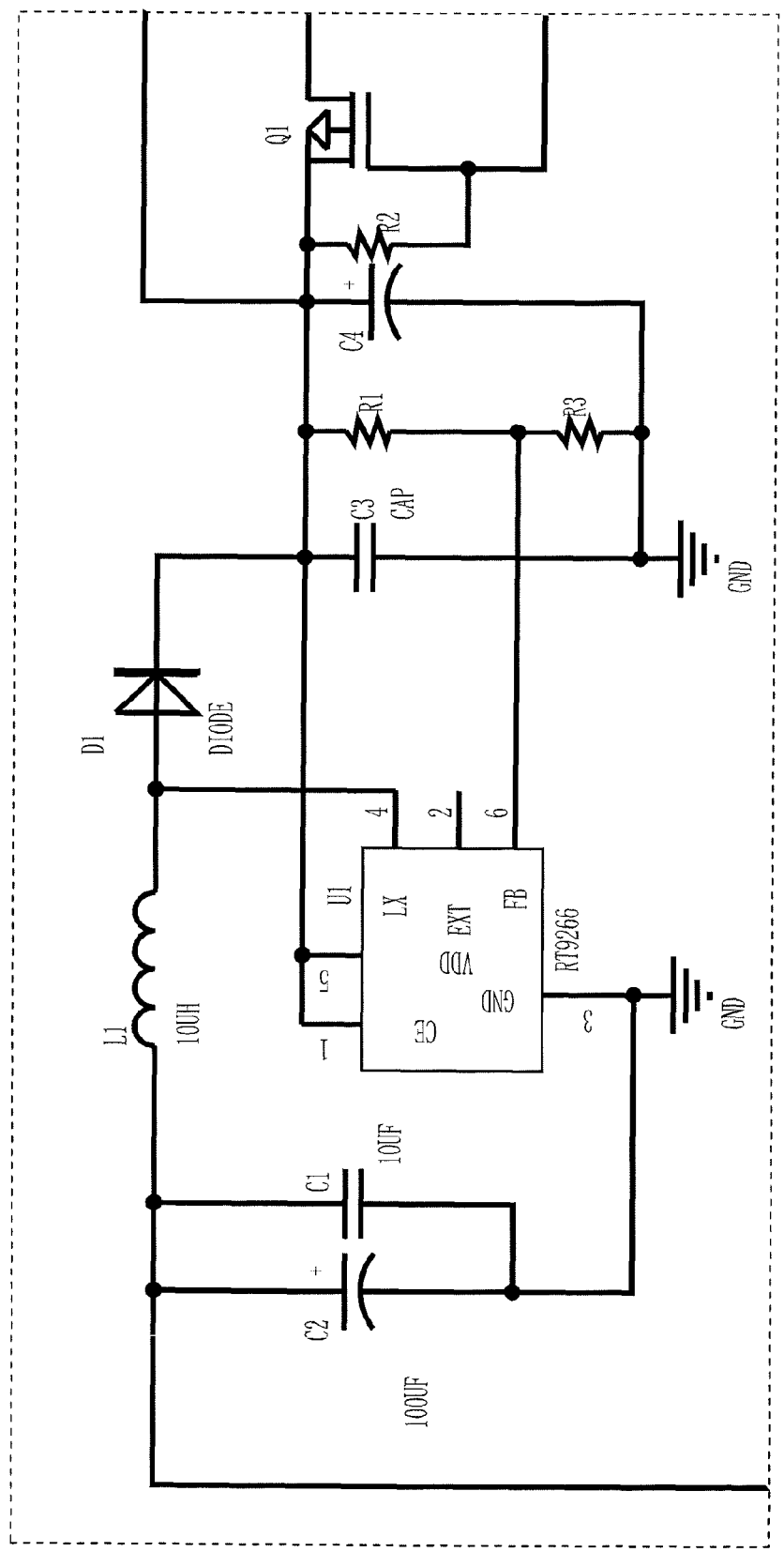

The present invention provides a source of light, such as a lamp, that does not require the use of a mechanical switch in order to operate the lamp. The present invention may be in the form of various types of portable lighting, such as headlights, flashlights, lanterns, spotlights, bike lights, and book lights. Therefore, while the present invention is particularly useful in applications in which the user may not have a free hand to operate the light, such as emergency situations, the present invention is not limited to such applications.

According to one embodiment of the present invention, the light source is an LED lamp that includes at least two modes, a spotlight and a floodlight. The control of the power to the light source, as well as the transition between the two modes may be achieved without a mechanical switch. This control is accomplished by use of a signal emitter and signal receiver and a controller which is able to recognize the distance travelled by the signal. Various types of signal generating means may be used as will be understood by those of skill in the art, including for example, an infrared (IR) light emitter or an ultrasound emitter. The use of IR is used in an exemplary embodiment of the invention.

The present invention may include one or more set of signal transmitters or receivers. According to one embodiment, the invention is in the form of a lamp having a lamp housing, with an IR transmitter and an IR receiver installed in the front of the lamp housing. When the light is turned on, an encoded IR signal is emitted by an IR transmitter. If an obstacle is located within a certain range of distances from the IR transmitter, the IR signal will reflect off of the obstacle and will be received by the IR receiver. Once the controller recognizes that the obstacle is within the particular range, the flood light is energized. When no obstacle is detected within the range, the controller will de-energize the floodlight and energize the spotlight.

As will be understood by those having skill in the art, the triggers for the floodlight and spotlight may be reversed to that previously described or the range of distances which will trigger a response may be lowered, raised, narrowed, or broadened depending on the desired sensitivity of the receiver and the intended application for the lamp. Also, the transmitter and receiver may be independently positioned in different locations in the housing. By positioning the IR transmitter and receiver on the front of the lamp, the IR signal will be emitted in generally the same direction as the light. Therefore, as the user moves, the mode will automatically transition to either the spotlight or the flood light providing the appropriate amount of light for a given situation. In an exemplary embodiment, when an obstacle is recognized, a controller associated with the portable light is programmed to energize a floodlight which has a soft, wide beam that is useful when illuminating something which is a short distance from the light source. When illuminating a distant object, a brighter, narrow beam, such as a spot light is often more useful than a floodlight.

According to another embodiment of the present invention, the lamp, in addition to having a first signal transmitter and receiver pair on the front of the housing, may also include a second signal transmitter and receiver pair on the side of the lamp housing. The second signal transmitter and receiver pair may operate in a similar fashion by detecting an obstacle or motion in order to trigger various modes. For example, a user may wave a hand in front of the second signal transmitter and receiver pair. The controller will recognize that an obstacle is within a certain range of distances in front of the second signal transmitter and receiver pair, for example 0 to 30 cm, and will transition between the spotlight and floodlight or activate various other modes, such as transitioning between various intensities of light (i.e. high, medium, and low light) or a strobe mode. The second signal emitter and receiver pair may also be used to override the first signal transmitter and receiver pair, so that the user may force the transition between the floodlight and the spot light. Including a second signal transmitter and receiver pair allows a user to control the various functions of the lamp hands-free, which may be advantageous if the user is, for example, holding tools with both hands and would otherwise be unable to operate a mechanical switch.

Referring now to, the figures, in which like numerals refer to like parts, FIGS. 1 through 8 illustrate an embodiment of the present invention in the form of a headlamp 10 containing a light source. Headlamp 10 is merely one exemplary embodiment of the present invention that may be worn on a user's head or attached to headgear. Other exemplary embodiments include portable lights for uniforms or vehicles, such as an automobile or a bicycle. Headlamp 10 includes a base portion 12 and a lamp housing 14. Any suitable material may be used to fabricate base portion 12 and lamp housing 14. In an exemplary embodiment, base portion 12 and lamp housing 14 are made from the same material, a plastic. Base portion 12 includes a groove 13 through which a belt or strap (now shown) may be inserted in order to fasten headlamp 10 to a surface, a user's head, or to head gear. As will be understood by those of skill in the art, base portion 12 may include other fastening means which allow headlamp 10 to be worn or removably mounted onto a surface. In this way, base portion 12 acts as a mount. Extending from base portion 12 are two generally perpendicular arms 16, 18 to which lamp housing 14 is attached. In an exemplary embodiment, attachment between lamp housing 14 and arms 16, 18 are such that lamp housing 14 is allowed to rotate or pivot, allowing a user to direct the light source in a particular direction. Lamp housing 14 may be rotated manually or, alternatively, a motor or some other mechanical means may be used to adjust the position of lamp housing 14.

Lamp housing 14 includes a front face 20 from which light or a signal may be emitted. In the exemplary embodiment of the present invention illustrated in FIGS. 1 through 8, lamp housing 14 includes a spotlight 22 and a floodlight 24 as light sources, an IR transmitter 26, and an IR receiver 28. By positioning IR transmitter 26 and IR receiver 28 on front face 20 of lamp housing 14, an IR signal from IR transmitter 26 and a beam of light from a light source (such as spotlight 22 or floodlight 24) may be transmitted in a common direction, and a control circuit 49 (FIG. 17) is able to recognize and illuminate an obstacle within a certain range of distances from the light source. Control circuit 49 is able to achieve this, for example, by determining the time of flight or comparing intensity of the signal emitted by IR transmitter 26 with the IR signal received by IR receiver 28. Control circuit 49 is configured to calculate at least one of distance and duration travelled by the signal and to select one of a plurality of modes when the distance is greater than or less than a predetermined or programmed set point or value. This set point or value may optionally be a distance selected by the user.

In an exemplary embodiment, when an obstacle is present within a short distance, an IR signal emitted by IR transmitter 26 will be received by IR receiver 28 and floodlight 24 will be activated. The maximum distance of the obstacle which will trigger illumination by floodlight 24 is preferably commensurate with the intensity of light that floodlight 24 is able to emit, such that the obstacle will be sufficiently illuminated. When there is no obstacle, i.e. when IR receiver 28 does not receive an IR signal, the default mode of headlamp 10 is that of spotlight 22. In an exemplary embodiment, the maximum lumens emitted by either spotlight 22 or floodlight 24 is selected based upon the application for headlamp 10. For example, the maximum lumens required for an indoor application, such as a book light, would be less than the lumens necessary for a lamp intended for outdoor use at night.

Headlamp 10 may also include a second IR transmitter 30 and a second IR receiver 32 on the side of headlamp 10, for example located on arm 18. As mentioned above, IR transmitter 30 and IR receiver 32 operates in a similar fashion as IR transmitter 26 and IR receiver 28. A user may simply wave a hand or an article such as a tool in front of IR transmitter 30 and IR receiver 32 at distance which is within a certain predefined range. Once the signal is received by IR receiver 32, control circuit 49 may accordingly energize either floodlight 24 or spotlight 22 or may adjust the intensity of the light or enable a strobe light. Control circuit 49 may be programmed such that headlamp 10 transitions between or among each of the various modes every time an obstacle or motion is sensed by IR receiver 32. Alternatively, control circuit 49 may be programmed to initiate a light mode depending on the distance of the obstacle. For example, waiving a hand within five centimeters of IR transmitter 30 and IR receiver 32 may initiate a strobe function, while waiving a hand ten to twenty centimeters from IR transmitter 30 and IR receiver 32 may allow the user to transition among various intensities of light, i.e. low, medium, and high.

While the present invention is intended to obviate the need for mechanical switches, lamps made according to the present invention may include manual switches which are used to override the automatically controlled functions. In an exemplary embodiment, the manual switches are mechanical. For example referring to FIGS. 3 and 5, a first manual switch 21 and a second manual switch 23 are located on the top of lamp housing 14. Switch 21 may be used to manually transition between spotlight 22 and floodlight 24 and switch 23 may be used to trigger automatic distance detection for transitioning between the lights (or vice versa). As will be understood by one of ordinary skill in the art, a lamp made according to the present invention may include one or more manual mechanical switches in order to supply power to the various components within the system, i.e. spotlight 22, floodlight 24, IR transmitter 26, receiver 28, and control circuit 49, or to transition the source of electric light between a plurality of light modes, including the intensity of the light.

Referring now to FIGS. 9 through 16, headlamp 10 is illustrated with a battery housing 36. Any means of connecting battery housing 36 to headlamp 10 may be used, such as an insulated cord 38, and such methods of connection are understood by those of skill in the art. Cord 38 connects to a connector 34 located on arm 16 of headlamp 10. Cord 38 may include multiple conducting wires to transmit current and/or signals between the components within headlamp 10 and batter housing 36. Battery housing 36 includes a power source for the various components within the system. In an exemplary embodiment, the power source is in the form of a battery and may be rechargeable. If the battery is rechargeable, battery housing 36 may include an input that is adapted to receive an adapter, so that the rechargeable battery may be recharged using conventional means, such as a standard electrical outlet.

Cord 38 is connected to battery housing 36 at a connection point 37. Adjacent to connection point 37 is an indicator 48. Indicator 48 provides information about the state of the headlamp 10. Such information may include and is not limited to the state of charge of the battery or whether a particular mode or setting has been activated, such as automatic distance detection. Battery housing 36 may also include an attachment plate 40, similar to base 12 of headlamp 10. Attachment plate 40 may include a plurality of grooves 42, 44, 46 that may be used to fasten battery housing 36 by using a belt or straps. Because headlamp 10 may be fastened to the front of headgear or the forehead of a user, the shape and location of base 12 may be configured to mount the battery housing 36 to the back of the headgear or rear of a user's head. Battery housing 36 may be made of a similar material as lamp housing 14 and base 12 which is made of plastic in an exemplary embodiment.

Thus, according to the present invention, a portable light is disclosed comprising a transmitter configured to emit a signal, a receiver configured to receive the signal from the transmitter which is often reflected, a source of electric light comprising a plurality of light modes, a power source, and a controller connected to a circuit comprising the transmitter, the receiver, the source of electric light, the power source, and a switch. The controller may be configured to control the switch and a transition between the plurality of light modes in response to the signal received by the receiver. The portable light optionally may further comprise a manual controller configured to control the supply of power from the power source to at least one of the source of electric light, transmitter, receiver, and controller.

As understood by those having skill in the art, the control circuits for an embodiment according to the present invention, such as control circuit 49 connecting the various electronic components of a headlamp 10, may be designed in a variety of ways. Referring to FIG. 17, an exemplary circuit diagram for control circuit 49 is illustrated. In FIG. 17, a first segment 50 (designated with a dashed box) of control circuit 49 is illustrated which includes a spotlight LED1 and a floodlight LED2 which may be turned on and off by actuating a manual switch S1 located in a second segment 52 of control circuit 49. Also, located in segment 52 is a controller (or chip) U2 which controls the transition between the various modes of operation of spotlight LED1 and floodlight LED2 by switch S1 or by the signals received by IR receivers re1, re2 in a third segment 54 of the control circuit 49. The signals are generated by IR transmitters D5, D6 in a fourth segment 56 of control circuit 49. Located in a fifth segment 58 of control circuit 49 are means of ensuring a stable power supply for controller U2 and IR transmitters D5, D6.

In an exemplary method of operation of control circuit 49, spotlight LED1 is energized upon actuating switch S1 once. Upon switch S1 a second time, floodlight LED2 is then energized. When switch S1 is actuated a third time, spotlight LED1 shuts off. The switching between spotlight LED1 and flood light LED2 may be achieved in the same manner without actuating switch S1, but instead by waiving an obstacle, such as a hand, in front of an IR transmitter (such as IR transmitter 26) so that an IR receiver (such as IR receiver 28) recognizes the presence of an obstacle or is able to detect motion in close proximity to the lamp housing. If the obstacle is detected within a certain range of distance, a signal is transmitted to controller U2 which initiates the transition between the various modes as previously described.

Figure 18:
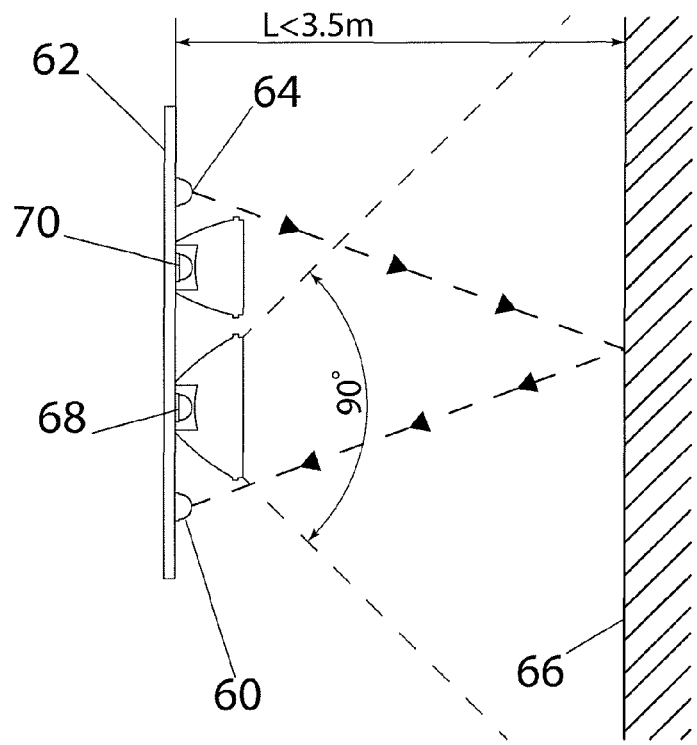
FIG. 18 is a first schematic of automatic distance detection operation of a light according to an embodiment of the present invention.
Figure 19:
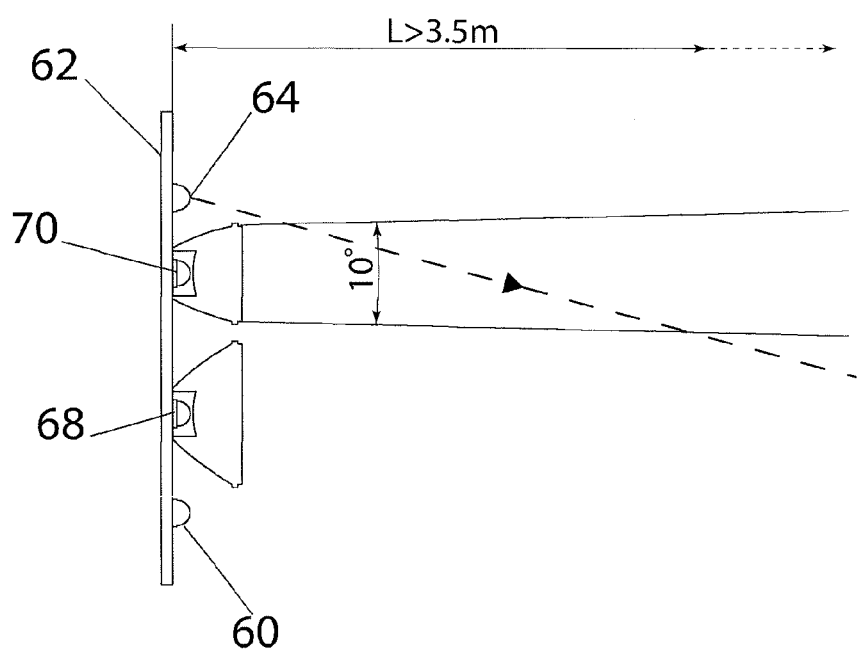
FIG. 19 is a second schematic of the operation in FIG. 18.

Also located within segment 52 is a second manual switch S2 which when actuated will activate automatic distance detection. When switch S2 is actuated once, controller U2 supplies power to IR transmitters D5, D6, thus initiating automatic distance detection. Referring to FIG. 18, an exemplary embodiment of automatic distance detection includes an IR receiver 60 mounted on the front of lamp 62 receiving a signal from an IR transmitter 64 when an obstacle 66 is within a certain distance L, for example <3.5 meters. IR transmitter 64 is also mounted on the front of lamp 60. IR receiver 60 in this circumstance will transmit a signal which upon recognition will activate floodlight 68. If there is no obstacle within 3.5 meters, no signal will be received by IR receiver 60, as illustrated in FIG. 19, resulting in deactivation of floodlight 68 and activation of spotlight 70. During operation, modes will be switched automatically from spotlight to floodlight (or vice versa) based on whether obstacles are detected within a certain distance. The automatic distance detection may be overridden when, for example, an obstacle or motion is detected by a second signal transmitter and receiver pair located on the side of the lamp.

Segments 50, 52, 54, 56, and 58 in FIG. 17 may be found on a single or multiple printed circuit boards which may be housed in various compartments of the headlamp 10. For example, printed circuit boards carrying one or more of segments 50, 52, 54, 56, and 58 may be located in one or both of lamp housing 14 or battery housing 36. In an exemplary embodiment, a printed circuit board connected to controller U2, spotlight 22, floodlight 24, IR transmitter 26, and IR receiver 28 are located in lamp housing 14, while a separate printed circuit board connected to indicator 48 is located in battery housing 36.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the scope of the invention.

What is claimed is:

1. A portable light for illuminating an object, the light comprising:
   a source of electric light, comprising a plurality of light modes;
   a transmitter configured to emit at least one signal separate from the electric light towards the object, the signal selected from the group consisting of infrared, ultrasound, and combinations thereof;
   a receiver configured to receive the signal from the transmitter after the signal is reflected off the object;

a power source; and a controller connected to a circuit comprising the transmitter, the receiver, the source of electric light, the power source, and a switch, wherein the controller is configured to control the switch and a transition between or among the plurality of light modes in response to a location of the object calculated from the reflected signal received by the receiver, and wherein the plurality of light modes comprises a floodlight mode and a spotlight mode.

2. The portable light of claim 1 further comprising a manual switch coupled to the controller and configured to control the supply of power from the power source to at least one of the source of electric light, transmitter, receiver, and controller.

3. The portable light of claim 2, wherein the manual switch coupled to the controller is configured to transition the source of electric light between or among the plurality of light modes.

4. The portable light of claim 1 further comprising a manual switch coupled to the controller configured to control the transition of the source of electric light between or among the plurality of light modes.

5. The portable light of claim 1, wherein the signal consists of infrared light.

6. The portable light of claim 1, wherein the signal consists of ultrasound.

7. The portable light of claim 1, wherein the transmitter is configured to emit the signal in a common direction with a beam emitted from the source of electric light.

8. The portable light of claim 1, wherein the automatic controller is configured to calculate at least one of distance and duration traveled by the signal and to select one of the plurality of modes when the distance or duration is greater than or less than a value.

9. The portable light of claim 8 further comprising a manual switch coupled to the controller configured to allow a user to select the value.

10. The portable light of claim 1, wherein the controller is configured to increase or decrease intensity of a beam emitted by the source of electric light in response to the signal received by the receiver.

11. The portable light of claim 1 further comprising a manual switch coupled to the controller configured to increase or decrease intensity of a beam emitted by the source of electric light responsive to the manual switch.

12. The portable light of claim 1, wherein the controller is configured to cause the source of electric light to flash intermittently in response to the signal received by the receiver.

13. The portable light of claim 1 further comprising a manual switch coupled to the controller configured to select a strobe mode responsive to the manual switch during which the source of electric light flashes intermittently.

14. The portable light of claim 1 further comprising a mount.

15. The portable light of claim 14, wherein the mount is configured to enable the portable light to be removably fastened to a vehicle.

16. The portable light of claim 14, wherein the mount is configured to enable the portable light to be removably fastened to a bicycle.

17. The portable light of claim 14, wherein the mount is configured to enable the portable light to be removably fastened to a book.

18. The portable light of claim 1, wherein the portable light is configured to be worn by a user.

19. The portable light of claim 18, wherein the portable light is configured to be worn on a user's head.

* * * * *